US007340612B1

(12) United States Patent
Durand et al.

(10) Patent No.: US 7,340,612 B1
(45) Date of Patent: Mar. 4, 2008

(54) METHOD FOR DEVICE REGISTRATION IN A WIRELESS HOME NETWORK

(75) Inventors: Alain Durand, Rennes (FR);
Christophe Laurent, Vignoc (FR);
Gilles Straub, Acigné (FR);
Christophe Vincent, Gahard (FR)

(73) Assignee: Thomson Licensing, Boulogne Billancourt (FR)

( * ) Notice: Subject to any disclaimer, the term of this patent is extended or adjusted under 35 U.S.C. 154(b) by 650 days.

(21) Appl. No.: 10/088,622

(22) PCT Filed: Sep. 20, 2000

(86) PCT No.: PCT/EP00/09256

§ 371 (c)(1),
(2), (4) Date: Mar. 19, 2002

(87) PCT Pub. No.: WO01/22661

PCT Pub. Date: Mar. 29, 2001

(30) Foreign Application Priority Data

Sep. 20, 1999 (EP) .................................. 99402299
Sep. 30, 1999 (EP) .................................. 99119430

(51) Int. Cl.
*H04L 9/00* (2006.01)
(52) U.S. Cl. ........................................ 713/182
(58) Field of Classification Search ................ 713/182
See application file for complete search history.

(56) References Cited

U.S. PATENT DOCUMENTS

| 5,077,790 | A | * | 12/1991 | D'Amico et al. ............ 380/249 |
| 5,377,267 | A | * | 12/1994 | Suzuki et al. ................ 380/248 |
| 5,999,812 | A | * | 12/1999 | Himsworth ............... 455/435.2 |
| 6,202,206 | B1 | * | 3/2001 | Dean et al. .................. 717/177 |
| 6,377,804 | B1 | * | 4/2002 | Lintulampi ............... 455/435.2 |
| 6,477,644 | B1 | * | 11/2002 | Turunen ..................... 713/161 |
| 6,651,105 | B1 | * | 11/2003 | Bhagwat et al. ............ 709/239 |

FOREIGN PATENT DOCUMENTS

| EP | 0658021 | 6/1995 |
| EP | 0658021 A1 * | 6/1995 |
| EP | 0944203 | 9/1999 |

* cited by examiner

*Primary Examiner*—Nasser Moazzami
*Assistant Examiner*—David Garcia Cervetti
(74) *Attorney, Agent, or Firm*—Joseph J. Laks; Paul P. Kiel

(57) ABSTRACT

A method for registering a device in a wireless network comprising a central controller. The method includes the step of asking a user whether he wants to install a new network or install a device on the network. In the case of installing a new network, the user enters a PIN code, an authentication key of the new network is generated and the device becomes the central controller. In the case of installing the device on an existing network, the user enters a PIN code, and upon authorization, receives an authentication key of the network for use in authenticating procedures with the central controller.

7 Claims, 6 Drawing Sheets

METHOD FOR DEVICE REGISTRATION IN A WIRELESS HOME NETWORK

This application claims the benefit, under 35 U.S.C. § 365 of International Application PCT/EP00/09256, filed Sep. 20, 2000, which was published in accordance with PCT Article 21(2) on Mar. 29, 2001 in English and which claims the benefit of EP patent application No. 99402299.4 filed Sep. 20, 1999 and EP patent application No. 99119430.9 filed Sep. 30, 1999.

The invention concerns a method for the registration of a device in a wireless home network. The invention can be used in the frame of a network based on the IEEE 1394-1995 serial bus standard, but is not necessarily limited to such an environment.

The IEEE 1394 bus is a wired bus, and suffers from inherent drawbacks: it uses a cable, which is a restriction by itself compared to a wireless product, and the cable length between two devices is limited to 4.5 meters. The introduction of wireless transmissions in an IEEE 1394-1995 based network is of an obvious interest. This topic is covered by the European ETSI BRAN project that is standardizing a wireless 1394 network in the 5 GHz band, under the title 'Hiperlan type 2'.

Hiperlan 2 is a layered standard defining a PHY layer (OSI level 1), a DLC layer (OSI level 2), and a number of Convergence Layers for some core network technologies (ATM, Ethernet, IEEE 1394 . . . ).

Hiperlan 2 proposes a security scheme based on authentication and encryption. This security scheme allows to restrict the access of the network to only allowed users. Hiperlan 2 is initially targeting business applications (corporate LANs), and thus can rely on a certain network management infrastructure. Hiperlan 2 requires for its authentication procedure that both the Mobile Terminal ('MT') and the AP/CC (Access Point—Central Controller) have a shared secret (an 'authentication key') prior to the authentication procedure. This authentication key is communicated to both the MT and the AP during network installation by the network manager.

In a home environment, it is not appropriate to rely on the user to perform such installation operations. The purpose of the present invention is to propose a method using mechanisms already specified in Hiperlan 2 to perform automatic installation of home devices.

The object of the invention is a method for registering a device in a wireless network comprising a central access point characterized in that it comprises the steps of:
  sending an identification code from the device to the access point;
  checking by said central access point whether the received identification code corresponds to an identification code stored by said central access point and if such checking is positive, sending an authentication key from said access point to said device;
  storage of said authentication key by said device for use in authentication procedures between said device and said access point.

According to a preferred embodiment, a unique identification code is used within a given network.

Further characteristics and advantages of the invention will appear through the description of a preferred, non-limiting embodiment of the invention. This embodiment will be described with the help of the following figures, which are an integral part of the present description:

Figure 3:
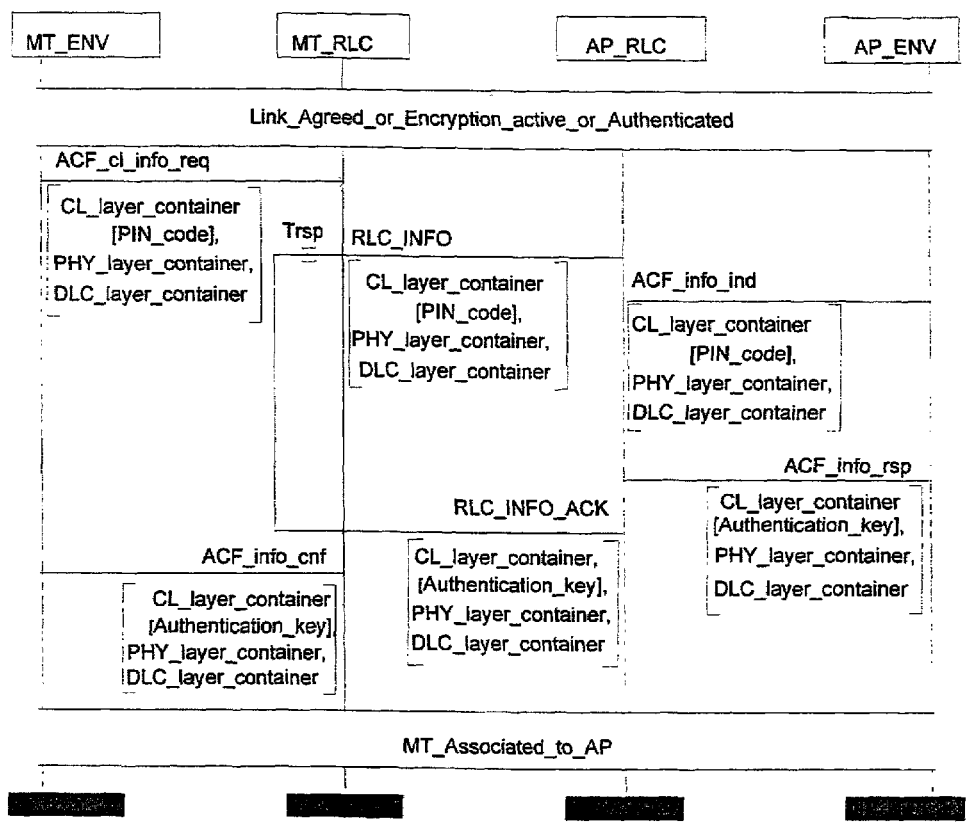
FIG. 3 is a message sequence chart defining the messages exchanged between different layers of the MT and AP during one of the phases (Information Transfer) defined by the chart of FIG. 2.
Figure 4A:
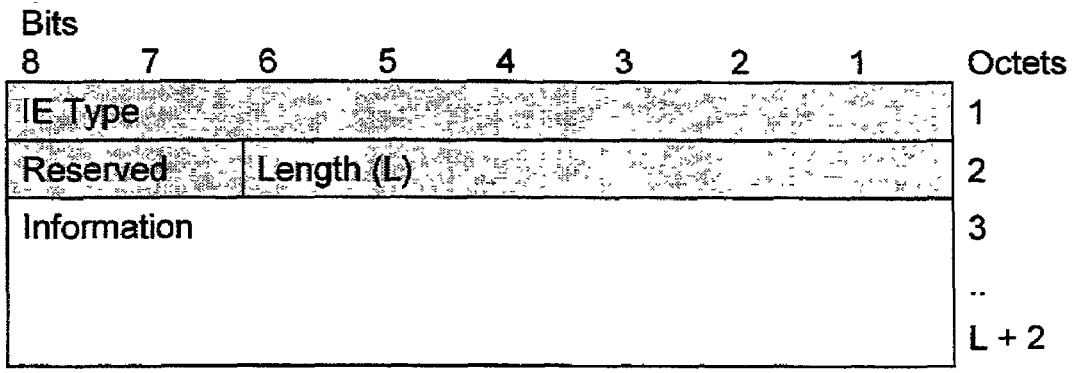
Figure 4B:
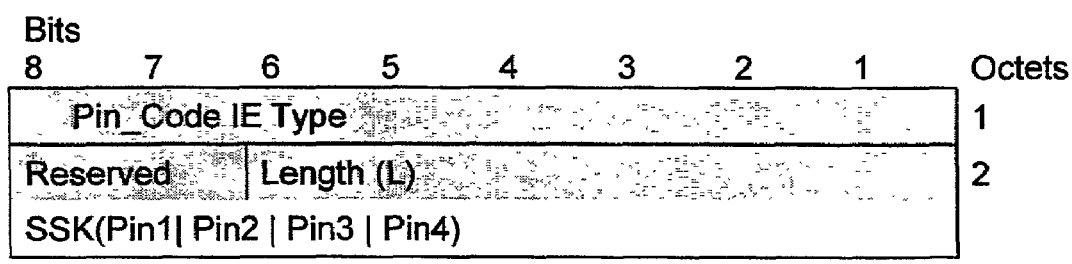
Figure 4C:
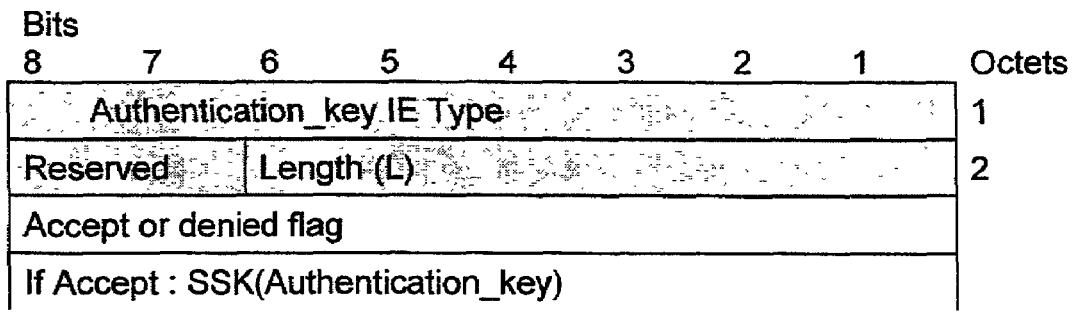

FIGS. 4a, 4b and 4c respectively represent a Convergence Layer information Container for containing Information Elements, and two Information Elements used during the message exchanges of the chart of FIG. 3.

Figure 2:
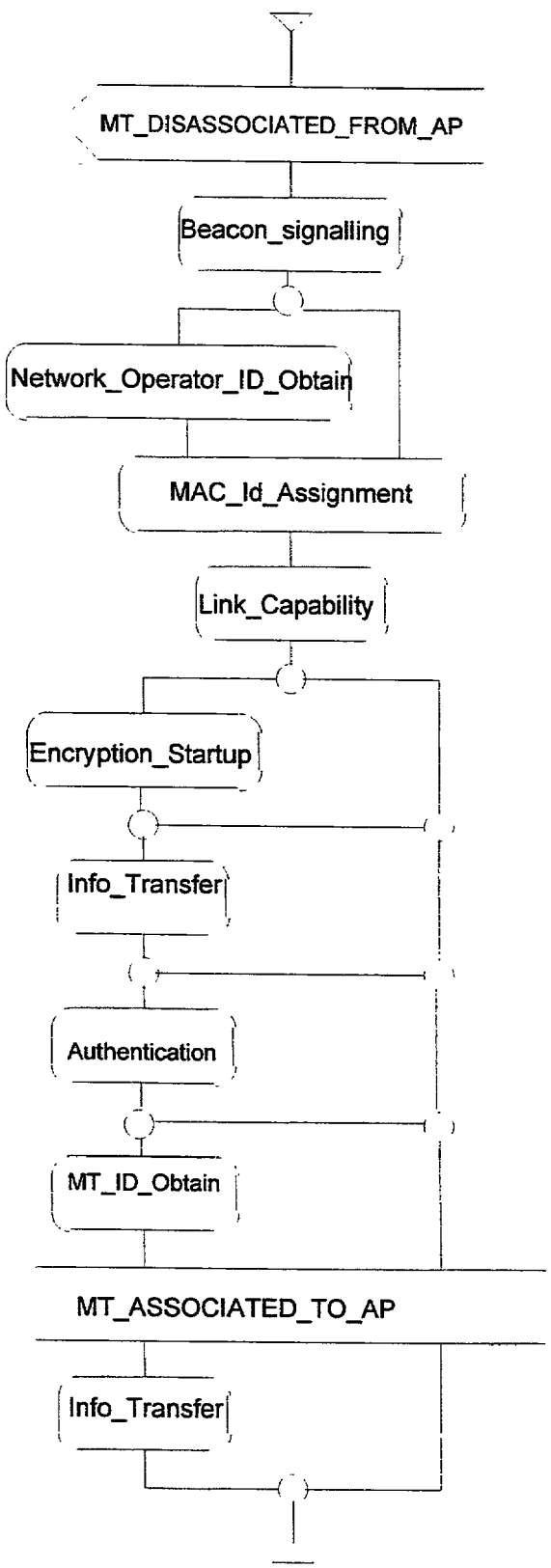
FIG. 2 is a high-level message sequence chart illustrating the messages exchanged between a Mobile Terminal and an Access Point for creating an association according to the present embodiment.
Figure 5:
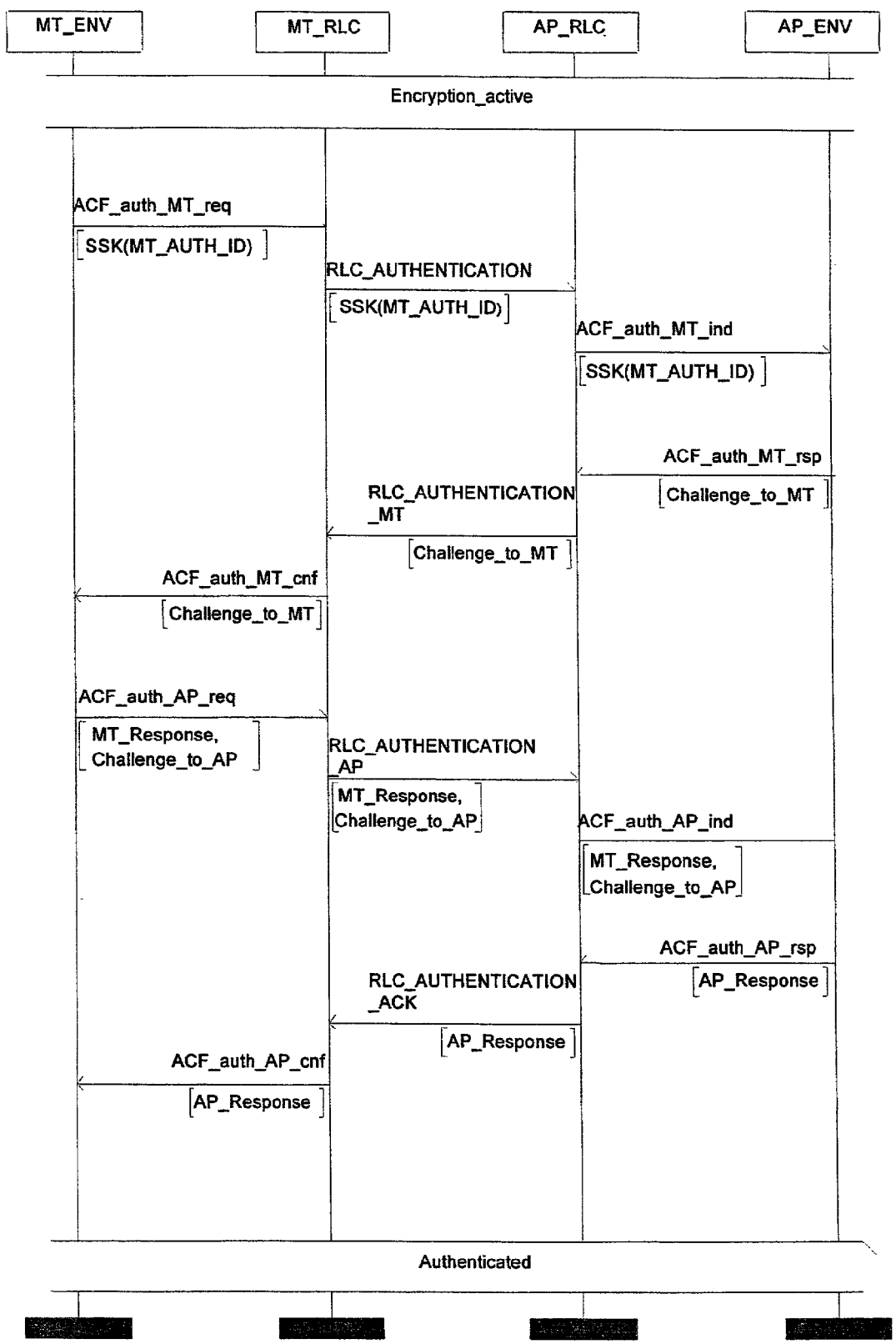

FIG. 5 is a message sequence chart defining the messages exchanged by the MT and the AP during the authentication phase of the chart of FIG. 2.

Figure 6:
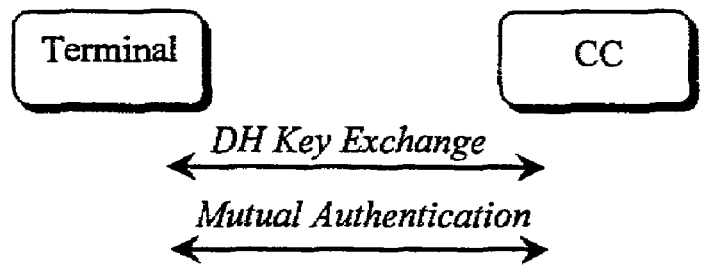

FIG. 6 is a schematic diagram of the association process of the terminal and the central controller.

Figure 7:
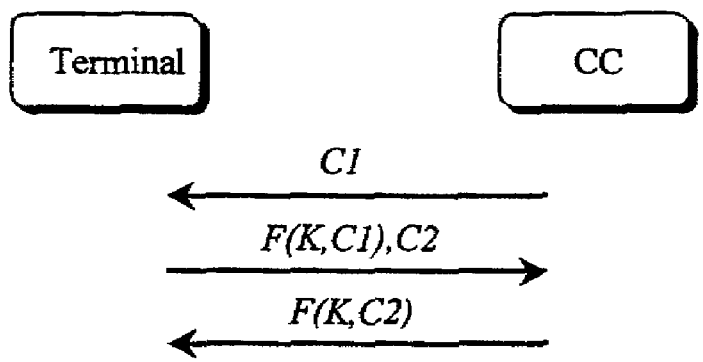

FIG. 7 is a schematic diagram of the authentication phase between the central controller and the terminal.

Figure 8:
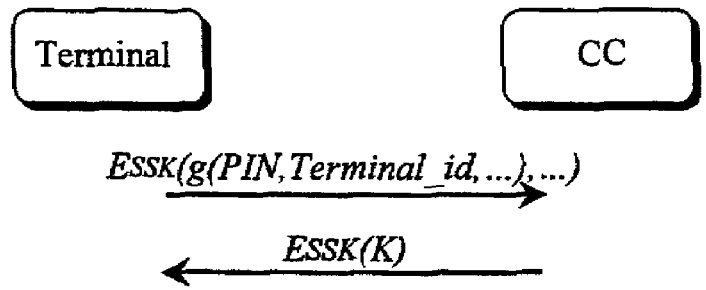

FIG. 8 is a schematic diagram of the key download phase from the central controller to the terminal.

The present embodiment is placed in the frame of BRAN/Hiperlan 2. More information concerning this environment can be found in the following document Broadband Radio Access Networks HIPERLAN Type 2 Functional Specification Data Link Control (DLC) layer parts 1 and 2 (DTS/BRAN030003-1) and associated documents among which the document DTS/BRAN-002004-2 concerning the Radio Link Control (RLC) sublayer.

Figure 1:
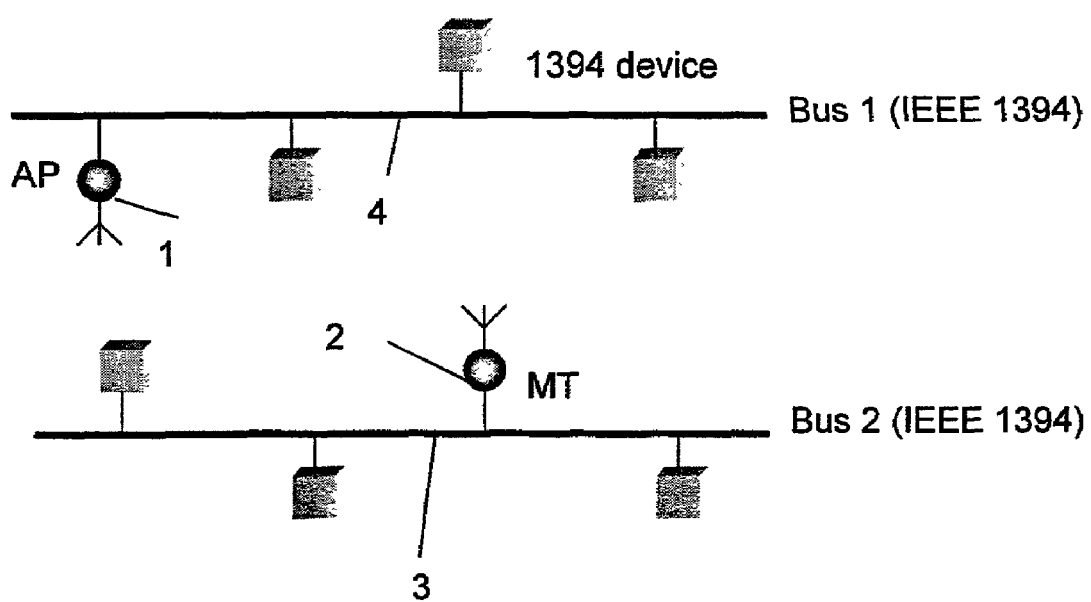
FIG. 1 is a schematic diagram of a network comprising two wired buses communicating through a wireless link.

FIG. 1 is a diagram of a network comprising an Access Point (AP) 1 and a Mobile Terminal (MT) 2, respectively connected to wired IEEE 1394 busses 3 and 4. The AP and the MT form a wireless link between the two wired busses. It is assumed in what follows that the AP (or Central controller CC) is a function that may be implemented in any device. There shall be no prerequisite that there is one fixed AP/CC device in the home network, but rather that one Central Controller is selected among a number of devices having such a capability.

Before a MT and the AP can associate, a preliminary key negotiation phase must take place in order to generate a symmetric encryption key. This negotiation is based on the Diffie-Hellman (DH) algorithm. The general mechanism of this algorithm is the following:

1. The MT and the AP have agreed on a base generator g and a large prime number n;
2. Both of them generate a random number called the Diffie-Hellman private value. Suppose that the MT generates the number x and the AP generates the number y;
3. The MT computes its DH public value MT_DH_PV=$g^x$ mod n and sends it to the AP;
4. The AP computes its DH public value AP_DH_PV=$g^y$ mod n and sends it to the MT.
5. The MT computes k=AP_DH_PV$^x$ mod n;
6. The AP computes k'=MT_DH_PV$^y$ mod n.

After this process, the AP and the MT can compute the shared secret session key since k=k'=$g^{xy}$ mod n. For this purpose this key, called Session Secret Key or 'SSK', is computed by:

$$SSK = HMAC\text{-}MD5(g^{xy} \bmod n, 0)$$

With:

$$HMAC\text{-}MD5(k,m) = MD5((k \text{ XOR } opad)|MD5((k \text{ XOR } ipad)|m))$$

Where:
    k is a secret key;
    m is the message;
    ipad is 0x36 repeated 64 times;
    opad is 0x5c repeated 64 times;
    XOR is exclusive OR;
    | is the concatenation operator.

Note that if someone eavesdrops on the communication between the MT and the AP, he only learns n, g, MT_DH_PV and AP_DH_PV. Thus, he cannot deduce the value of the key k since he does not know the secret random numbers x and y.

Once the SSK key is generated, the authentication phase can take place. This phase allows the MT to be authenticated by the AP and allows the AP to be authenticated by the MT.

In Hiperlan 2, this step is based on a challenge-response approach:

The MT sends its identifier to the AP, encrypted with the just negotiated SSK encryption key;

The AP then sends a challenge (that is a random number) $C_{AP}$ to the MT;

The MT proves its identity by responding to the challenge $C_{AP}$. For this purpose, it "signs" the challenge either with a secret key shared with the AP or with its private key when a PKI (Public Key Infrastructure) is used. The MT sends its response $R(C_{AP})$ as well as a new challenge $C_{MT}$ to the AP;

The AP verifies the response $R(C_{AP})$, "signs" the challenge $C_{MT}$ in order to prove its identity and sends back its response $R(C_{MT})$ to the AP;

The MT verifies the response $R(C_{MT})$.

If the responses $R(C_{AP})$ and $R(C_{MT})$ are correct, both MT and AP are thus authenticated since they proved they know a secret.

In a business environment the authentication would be configured by a network administrator. For a home environment, a more automatic authentication procedure is desirable. The interface with the user should be as simple as possible. The 1394 bus per se has "plug and play" capabilities, so it is desirable to extend this capability to the wireless network.

A MT wanting to associate with a network needs an authentication key that shall be known by the Central Controller. This authentication key is used during the association phase, via a challenge/response mechanism, in a way similar to that given above. It has been proposed that a single common key be used for the whole network, and that this key be based on the GUID of the first Central Controller registered in the network.

More specifically, before using a wireless device, an installation phase will be necessary. This phase consists in giving the authentication key of the network to the new MT. According to the present embodiment, this value transfer is secured by a code such as a PIN code to prevent any neighbor from obtaining this key.

It is proposed to use a same PIN code on all the devices for device installation. This PIN code is entered by the user and exchanged over the air interface. It is checked by the CC, that can then communicate the authentication key. The authentication key shall then be stored by the MTs (on non volatile memory), and it will be used at any power on phase to carry out the authentication process.

This method focuses on devices that provide enough user interaction capabilities for entering the PIN code. Typically, such a device comprises a display and a number of keys. The device may provide an installation menu that the user has to select. Upon activation of the installation menu, the device erases any previously stored authentication key. Such devices may also be much simpler. User input may be reduced to the setting of micro-switches.

If the device is a CC capable device, then the device shall further ask the user:
    *A/do you want to install a new network?
    *B/do you want to install a device on an existing network?

If the device is not a CC capable device, then there is no need for this submenu since the user can obviously only connect this device to an existing network.

If the user answers <<A>>, then the device asks for a PIN code. This PIN code will be valid for the whole network. The device then builds an authentication key by concatenating its own GUID and the entered PIN code. The PIN code is stored in non volatile memory to be retrieved at each power on. The device can then start CC operation (i.e. act as an HL2 Access Point), waiting for further devices.

The GUID is a 64-bit quantity used to uniquely identify an IEEE 1394 device. It consists of a 24-bit company ID (obtained from the 1394 Registration Authority Committee) and a 40-bit serial number assigned by the device manufacturer. The GUID is stored in a device's configuration ROM and is persistent over 1394 network resets.

Other types of identifiers may also be used, as long as it is made sure that no two devices in the network have the same identifier.

If the user answers <<B>>, then the device asks for a PIN code (that shall be the whole network PIN code which the user already initialized on the first installed device). The device then starts MT operation. The MT scans the spectrum, and looks for a beacon under the form of a BRAN frame header. When it finds such a beacon, and after SSK determination, using Link_Info messages, it sends the user entered PIN code to the CC. The user entered PIN code shall be encrypted using the Diffie Hellman session key (the RLC messages are not encrypted). The CC can then check whether the received PIN code (from the air interface) is the same as the one it already has. If the check is successful, then a positive answer is sent through the RLC_INFO_ACK message, with the authentication key (the authentication key is also encrypted using the Diffie-Hellman session key). Otherwise a denial is sent in the RLC_INFO_ACK. More details of the exchange are given in FIG. 3.

Once the MT has received the authentication key, the installation phase is over. The MT shall store the key in a non-volatile memory. It could also store the NET_ID (contained in a field of the BCCH) that can help in further frequency scanning. The NET_ID does not uniquely identify a network, but can simplify the frequency scanning and avoid useless authentication tentatives.

It can then further run the power-on, or booting, procedure (see below). If the device does not get the authentication key, it shall look for another frequency, and thus for another CC and try again.

According to the present example, the PIN code and the authentication key are part of the CL_Info container, and thus described for each convergence layer. Another possibility is to make it part of the DLC layer container since it contains data that is relevant to the DLC layer.

FIG. 4a represents the convergence layer information container's format (CL_layer_container). It contains several Information Elements (IEs). FIGS. 4b and 4c represent the formats of two IEs which are needed for the protocol, namely the PIN code IE and the Authentication key IE, and contained in the convergence layer container. The variable 'Authentication_key) is equal to the concatenation of the GUID of the first installed GUID and the PIN code.

The procedure at power on is illustrated by FIG. 2: A MT only device searches for the beacon by scanning the available frequencies. If it previously stored a network identifier (Net_ID), it first searches for the BCCH field containing this identifier. Once the BCCH is found, encryption and authentication steps are carried out. If the BCCH with the correct Net_ID is not found, CCs with other identifiers may be searched for.

No specific parameter is needed in the RLC_Authentication message (since a single key is used). The authentication key (GUID+PIN code) is used by the MT to compute the challenge response sent in the RLC_Authentication_AP message. The same authentication key (GUID+PIN code) is used by the AP/CC to check whether the device is allowed or not (whether it shares the same key), and thus to generate the response.

If the MT is authenticated, then it can complete the association phase and join the network. Otherwise it tries on another CC.

FIG. 5 describes the message exchange of the authentication procedure.

The described method may be extended to multiple authentication keys.

The major drawback of the present approach appears when a device is to be uninstalled: when the user wants to remove only part of his devices (at least one stolen device), he has to change the pin code, and to reinstall all his wireless devices.

This drawback disappears when one authentication key is used for each device. The same procedures and message sets can be used for a multiple authentication key network with the following modifications:

Installation Phase:

During installation, the MT has to send its GUID to the CC. The MT GUID concatenated to the PIN code is the MT authentication key. The authentication_key IE can be used (or even a new information element can be defined, without the Accept/denied flag), and can be carried in the RLC_INFO message. The Authentication key sent in the RLC_INFO message has to be encrypted using the Diffie-Hellman session key.

The PIN code is used by the CC to check whether the MT is allowed to be installed. If the PIN code test matches, then the authentication key of the MT is stored by the CC in non volatile memory.

The RLC_INFO_ACK in that case just contains the accept denied flag. No authentication key is needed.

Power on Phase:

During Authentication phase, the RLC Authentication message sent by the MT to the CC shall contain the authentication ID of the MT (which is the GUID of the MT). Then the authentication key to be used for the challenge/response exchange shall be the MT GUID concatenated to the PIN code.

This approach allows a user to remove one device without needing to reinstall his complete network.

The invention has several advantages. User involvement is reduced to just entering a PIN code during device installation. Also, the PIN code provides a good level of security for device installation and guarantees that devices are wirelessly installed to the appropriate network.

The first embodiment concerns the implementation within the context of BRAN HIPERLAN 2. The second embodiment, which will now be described, takes a more general approach, and describes a more secure way of transmitting information from the MT to the CC.

In this embodiment, we propose a solution to secure the registration of a new terminal in an existing network. This network handles two types of device:

1. General purpose devices (camcorder, television, phone, tape recorder, PC, etc.) called terminal in the document;

2. A special device which acts as a central server and that is called Central Controller (CC) in this document. Note that there is only one CC in the network at the same time.

We suppose that all communications between a terminal and the CC may be secured with the use of cryptographic tools. A terminal can communicate with the CC once the association phase has been executed. This phase is shown in FIG. 6.

As shown in FIG. 6, and as in the first embodiment, the association phase has two steps:

1. In DH Key Exchange step, the terminal and the CC generate a session key (called SSK) that will be used to secure all messages exchanged between the terminal and the CC. This key creation uses the Diffie-Hellman protocol previously described.

2. In the mutual authentication step, both devices are mutually authenticated in order to be sure each is valid (e.g. not a hacked device).

This second step can be based on a challenge-response approach that proves that each actor knows a secret (i.e. the authentication key) that is shared by all devices in the network. As shown in FIG. 7, this scheme has three steps:

1. The CC sends to the terminal a random number, called challenge, C1;

2. The terminal responds by applying a function F to the challenge. The result depends on the challenge and on the secret authentication key K shard by the terminal and the CC (F can be a Message Authentication Code—or MAC—for example). In the same message, the terminal sends to the CC a new challenge C2;

3. The CC verifies the response given by the terminal and responds to the challenge C2 by applying the function F. The terminal verifies the response given by the CC.

At the end of this authentication, both parties are mutually authenticated.

In this scheme, a terminal must know the shared secret K to be authenticated. Therefore, when a user buys a new terminal, this shared secret must be stored in the terminal before any use. However, this secret is different in each network and thus, this phase must be made dynamically on each network.

According to the present embodiment, it proposed to secure the registration scheme that downloads the shared secret key K in a new terminal. This scheme must be secured to avoid that anyone can register his terminal in another one's network. For example in a home network environment, a user certainly does not want his neighbor to spy on him.

The following notations are used:

"$E_K(M)$" denotes the encryption of a message M with the symmetric key K;

"|" denotes the concatenation operator.

More information concerning cryptography may be found in the book: Bruce Schneier, "*Applied Cryptography*", Wiley Publisher, 1996, second edition.

The proposed solution downloads the secret key K into a device. A PIN code (i.e. an identifier) is used to identify each network. The PIN code is stored in the CC.

Two scenarios are presented: 1. The device is the first device installed in the network; 2. The device is a new device in the network.

In the first case, the secret key K must be generated by the device (which acts therefore as the CC) whereas in the second case, the secret must be sent by the existing CC to the new installed device.

In the first case, the device acts as the CC and must generate the secret key K. It can be the output of a random generator, or the result of a function f that depends on several parameters such as the device identifier, the network PIN and eventually other parameters:

$$K=f(device\_id, PIN, \ldots).$$

Once the PIN is generated, it may be checked that it is not used by another close network in order to ensure the registration of the terminal on the right network.

In the second case, when a new device is installed in the network, it must know the secret K before the authentication phase (see FIG. 7) can take place. The key download is executed just after the "DH Key Exchange" phase where a terminal and the CC exchange the secret session key SSK (see FIG. 6).

FIG. 8 illustrates this key download.

The key download phase has two steps:
1. The terminal requests the network PIN from the user (the terminal must have a way to perform this task). Then, the terminal computes the result of a function g using the PIN and other parameters such as the terminal identifier. The computed value is then encrypted eventually with other parameters using the key SSK. The result is sent to the CC. The input parameters of function g should present some redundancy with those involved in the encryption.
2. The CC recovers the message, checks the redundancy and retrieves the entered PIN. If the PIN corresponds to the stored network PIN, then the CC sends the secret K, encrypted with the key SSK, to the new terminal. Once the terminal has decrypted K, it stores it into a secure memory and can now terminate the association phase.

The security aspects of the proposed solution will now be described. The terminal can be installed only if the user knows the network PIN. However, a PIN is generally composed of four digits. Thus the solution should prevent from a brute force attack. This attack is made difficult by the use of the function g (which is different from the base generator of the same name of the description of the DH algorithm given in the first embodiment). For this function g, two cases are possible:

1. This function is kept secret;
2. This function is known.

Note that both cases impose the user to enter by hand the PIN on the new installed terminal. Therefore, we can limit the number of PIN trials on the terminal itself.

The case when g is a secret function will now be described. An attacker cannot develop a software that automatically scans all possible PINs since he does not know the function g. Therefore, he must enter manually all possible PINs if he wants to crack the system. The use of the device identifier as parameter of the function would allow to detect successive unsuccessful attempts by the CC. The CC could manage a list of malicious terminals.

In this case, the security of the system depends on the PIN and on the function g.

The case when g is a known function will now be described. Thus a secret must be added to prevent from a brute force attack. All devices share a global secret key denoted by GSK. For example, this key can be kept secret by an authority which inserts it in all devices before sale.

Now, the function g can be defined as follows:

$$g=E_{GSK}(PIN|Terminal\_id|r)$$

Where r denotes a random number generated by the terminal.

Then, the message sent is:

$$E_{SSK}(E_{GSK}(PIN|Terminal\_id|r)|r).$$

When the CC receives this message, it performs the following steps:
1. It decrypts the message by using the key SSK and retrieves the random number r,
2. It decrypts the first part of the previous decrypted message to retrieve the message PIN|Terminal_id|r. Then, it tests if the r value decrypted in step 1 and the r value decrypted in the present step match. Unmatched values mean that an attacker tries to crack the system and thus the CC can enter in a blocked state.

In this case, the security of the system depends on the key GSK and on the use of the random number r. Indeed, if an attacker tries to crack the system without knowing the global key GSK, it cannot generate the message $E_{GSK}(PIN|Terminal\_id|r)$. Therefore, the CC cannot retrieve the same random number values and thus, the system is blocked at the first hacking attempt. However, if the user enters a bad PIN on a valid device, the system does not block since the message $E_{GSK}(PIN|Terminal\_id|r)$ is well formed.

GLOSSARY

ACF Association Control Function
AP Access Point
BCCH Broadcast Control CHannel
CC Central Controller
CL Convergence Layer
DLC Data Link Control Layer
DH Diffie-Hellman
ENV Environment Layer (Convergence Layer)
GSK Global Secret Key
GUID Global Unique Identifier
MAC Medium Access Control (1$^{st}$ embodiment) or Message Authentication Code (2$^{nd}$ embodiment)
NET_ID Network Identifier
PHY Physical Layer
PIN Personal Identification Number
RLC Radio Link Control Protocol
SSK Session Secret Key (1$^{st}$ embodiment) or Shared Secret Key (2$^{nd}$ embodiment)

The invention claimed is:
1. Method for registering a device in a wireless network comprising:
  (a) asking a user, through a user interface, whether the user wants to install a new network or install said device on an existing network, and, in case the user wants to install a new network:
  (b) asking the user to enter a PIN code, said entered PIN code becoming the PIN code that is valid for the entire new network, whereby the PIN code is used to install a device on the new network;
  (c) generating an authentication key which becomes the authentication key of the new network; and

(d) the device becoming the central controller of the new network, and in case the device is to be installed on an existing network comprising an existing central controller:
(e) asking the user to enter a PIN code;
(f) checking by said existing central controller whether the entered PIN code corresponds to a PIN code of the existing network and if such checking is positive, sending an authentication key of the existing network from said existing central controller to said device; and
(g) storing said authentication key of the existing network by said device for use in authentication procedures between said device and said existing central controller.

2. Method according to claim 1, wherein the authentication key generated at step (c) is generated by a random generator.

3. Method according to claim 1, wherein the authentication key generated at step (c) is the result of a function depending on a device identifier and on said PIN code of the network.

4. Method according to claim 1, wherein said authentication key of one of said existing and new networks is encrypted using a secret session key before being sent to said device, the secret session key being previously negotiated between said device and its corresponding central controller.

5. Method for registering a device in a Wireless network comprising:
(a) asking a user, through a user interface, whether the user wants to install a new network or to install the device on an existing network; and
in case the user wants to install a new network:
(b) asking the user to enter a PIN code, said entered PIN code becoming the PIN code that is valid or the entire new network, whereby the PIN code is used to install a device on the new network; and
(c) the device becoming the central controller of the network; and
in case the device is to be installed on an existing network comprising a central controller:
(d) asking the user to enter a PIN code;
(e) said device sending said PIN code and a device identifier to said central controller of the existing network;
(f) checking by said central controller of the existing network whether the entered PIN code corresponds to a PIN code of the existing network and, if such checking is positive, generating an authentication key and sending said authentication key from said central controller of the existing network to said device; and
(g) storing said authentication key in said device for use in authentication procedures between said device and said central controller of the existing network.

6. Method according to claim 5, wherein the authentication key generated at step (f) is the result of a function depending on a device identifier and on said PIN code of the existing network.

7. Method according to claim 5, wherein said authentication key of the network is encrypted using a secret session key before being sent to said device, the secret session key being previously negotiated between said device and said central controller of the existing network.

* * * * *